(12) United States Patent
Freund et al.

(10) Patent No.: US 11,985,074 B1
(45) Date of Patent: May 14, 2024

(54) DYNAMICALLY INFORMED DIGITAL TWINS

(71) Applicant: Dell Products L.P., Round Rock, TX (US)

(72) Inventors: Werner Spolidoro Freund, Rio de Janeiro (BR); Herberth Birck Fröhlich, Florianópolis (BR); Ítalo Gomes Santana, Rio de Janeiro (BR); Yanexis Pupo Toledo, Niterói (BR)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/331,819

(22) Filed: Jun. 8, 2023

(51) Int. Cl.
*H04L 47/70* (2022.01)
*H04L 41/16* (2022.01)

(52) U.S. Cl.
CPC ............ *H04L 47/823* (2013.01); *H04L 41/16* (2013.01); *H04L 47/822* (2013.01)

(58) Field of Classification Search
None
See application file for complete search history.

(56) References Cited

U.S. PATENT DOCUMENTS

| | | | | |
|---|---|---|---|---|
| 11,595,269 | B1* | 2/2023 | Ghosh | G16Y 10/75 |
| 2022/0200917 | A1* | 6/2022 | Mortensen | H04L 43/50 |
| 2022/0413989 | A1* | 12/2022 | Karri | G06F 9/5027 |

OTHER PUBLICATIONS

Tao, F et al., "Chapter 2—Applications of Digital Twin", Digital Driven Smart Manufacturing, Feb. 15, 2019, pp. 29-62, https://doi.org/10.1016/B978-0-12-817630-6.00002-3.

Errandonea, Itxaro et al., "Digital Twin for Maintenance: A literature review", Computers in Industry 1 2 3 103316, Elsevier, Oct. 5, 2020.

* cited by examiner

*Primary Examiner* — Angela Nguyen
(74) *Attorney, Agent, or Firm* — Workman Nydegger

(57) ABSTRACT

One example method includes adjusting overall resource usage in a digital twin network that includes a dynamically informed digital twin of a near-edge node and a dynamically informed digital twin of far-edge nodes. Operational conditions of a dynamically informed digital twin are evaluated based on contextual variables that represent operating properties of the dynamically informed digital twin. Updated information levels are received from an orchestration service of the dynamically informed digital twin. The updated information levels define an amount of resources the dynamically informed digital twin will use in the performance of primary tasks. The updated information levels are parsed. A physical entity associated with the dynamically informed digital twin is informed to adjust sampling properties or increase or decrease its activity and the dynamically informed digital twin is informed to modify information processing methods to thereby adjust the overall resource usage in the digital twin network.

20 Claims, 9 Drawing Sheets

DYNAMICALLY INFORMED DIGITAL TWINS

FIELD OF THE INVENTION

Embodiments of the present invention generally relate to edge environments. More particularly, at least some embodiments of the invention relate to systems, hardware, software, computer-readable media, and methods for dynamically informed digital twins implemented in an edge environment.

BACKGROUND

Edge environments typically include a near-edge node and various far-edge nodes. The near-edge node typically includes more computing resources than the far-edge nodes and thus often will perform some processing tasks for the far-edge nodes. In addition, the near-edge node will often provide orchestration services to the far-edge nodes. These tasks can require large amounts of communication bandwidth. This can be problematic in an edge environment where the communication bandwidth is limited and/or the computing resources of the near-edge node are limited.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
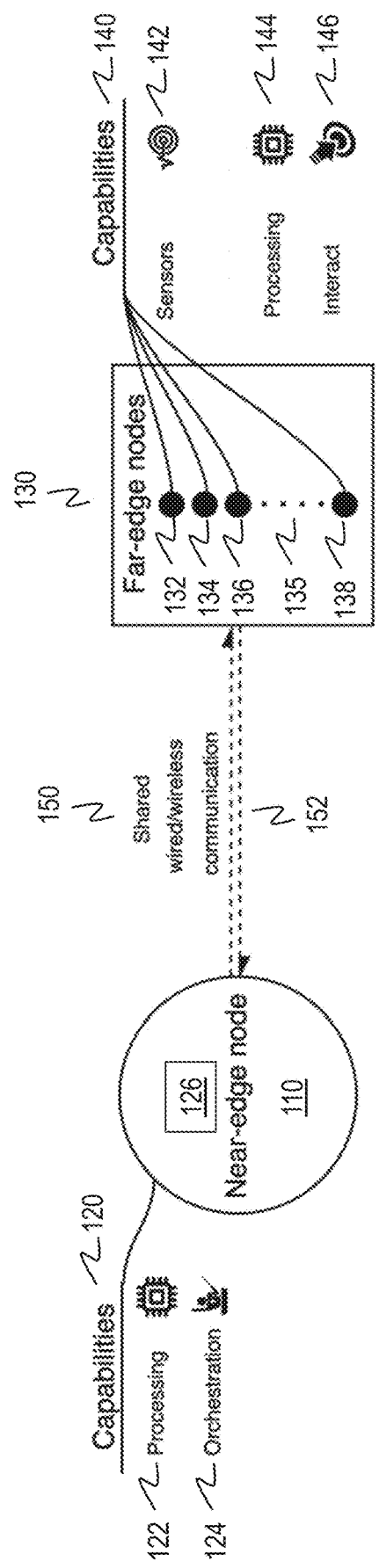
FIG. 1 discloses aspects of an edge environment according to the embodiments disclosed herein.

Embodiments of the present invention generally relate to edge environments. More particularly, at least some embodiments of the invention relate to systems, hardware, software, computer-readable media, and methods for dynamically informed digital twins implemented in an edge environment.

One embodiment relates to a method for adjusting overall resource usage in a digital twin network that includes a dynamically informed digital twin of a near-edge node and a dynamically informed digital twin of far-edge nodes. Operational conditions of a dynamically informed digital twin are evaluated based on contextual variables that represent operating properties of the dynamically informed digital twin. Updated information levels are received from an orchestration service of the dynamically informed digital twin. The updated information levels define an amount of resources the dynamically informed digital twin will use in the performance of primary tasks. The updated information levels are parsed. A physical entity associated with the dynamically informed digital twin is informed to adjust sampling properties or increase or decrease its activity and the dynamically informed digital twin is informed to modify information processing methods to thereby adjust the overall resource usage in the digital twin network.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. Also, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that improved operation of the edge environment. For example, many edge environments have limited computing resources and communication bandwidth. This causes operational problems at the near-edge node when there are too many far-edge nodes for the near-edge node to communicate with or to perform processing tasks. The embodiments disclosed herein provide for a digital twin network that includes a dynamically informed digital twin that is able to monitor and then reduce the overall resource usage in the edge environment. A resource allocation service The adjusts information levels in the dynamically informed digital twin that define the resource usage needed to perform various tasks. When the dynamically informed digital twin needs less resources, its information levels will be adjusted to a lower level, thus requiring less resources and when it needs more resources, its information levels will be adjusted to a higher level. Thus, the embodiments disclosed herein provide a solution to the technical problem of how to adjust computing resources and communication bandwidth in a resource constrained edge environment.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of An Edge Environment

The embodiments disclosed herein may be practiced in an edge environment, although this is not required as the embodiments disclosed herein are not limited to any particular environment. Accordingly, a short explanation of an edge environment 100 will now be provided in relation to FIG. 1. As illustrated in FIG. 1, the edge environment 100 includes a near-edge node 110 and multiple far-edge nodes 130. The near-edge node 110 has various capabilities 120. For example, the near-edge node 110 has processing capabilities 122 that allow the near-edge node 110 to provide processing for itself and for one or more of the far-edge nodes 130. In addition, the near-edge node 110 has orchestration capabilities 124 that allow the near-edge node 110 to orchestrate the operation of one or more of the far-edge nodes 130. The near-edge node 110 further has data storage capabilities 126. It will be appreciated that the near-edge node 110 can include additional capabilities that are not illustrated. In one embodiment, the near-edge node 110 is a central node of a warehouse that orchestrates the operation of various far-edge nodes that are autonomous mobile robots (AMR) or smart forklifts.

As illustrated in FIG. 1, the edge environment 100 includes the various far-edge nodes 130. For example, the edge environment includes a far-edge node 132, a far-edge node 134, a far-edge node 136, a far-edge node 138, with the ellipses 135 illustrating that there can be any number of additional far-edge nodes 130. Each of the far-edge nodes 130 includes various capabilities 140. For example, the far-edge nodes 130 include sensors 142 that allow the far-edge node to monitor its surroundings or to monitor its operation. The far-edge nodes 130 also include processing capabilities 144, which allow the far-edge node to perform local processing. It will be noted that in many embodiments, the processing capabilities 144 are not as large as the processing capabilities 122 of the near-edge node 110. Accordingly, the far-edge nodes 130 can utilize the processing capabilities 122 as needed. The far-edge nodes 130 also have interaction capabilities 146 that allow the far-edge nodes the ability to interact with their surroundings and with other far-edge nodes. Although not illustrated, the far-edge nodes also include data storage capabilities and other additional capabilities that are not illustrated. In one embodiment, the far-edge nodes 130 are the AMRs or smart forklifts operating in the warehouse of the near-edge node 110.

Accordingly, the far-edge nodes are sufficiently important assets in the edge environment 100. In some embodiments, the far-edge nodes include the sensors 142. However, in some cases, the sensors 142 can be restricted to measure the asset inner functioning status, for example the dynamics of a motor responsible for a production running machine. Some assets can provide information of their surroundings, for example security cameras, etc. This is also the case of some assets providing the ability to interact with the environment such as AMRs and smart forklifts. These assets can also respond to commands from the near-edge node 110, for example an AMR can be used to move some items of the inventory, a production running machine can be commanded to change its operation speed, etc.

To properly control the edge environment 100, the near-edge node 110 collects sensed information from the far-edge nodes 130 to monitor the environment operation and take orchestration decision that are communicated back to the far-edge nodes 130 using shared communication 150. The shared communication 150 can occur via multiple wired and/or wireless channels 152. The channels 152 can be shared by several far-edge nodes 130.

B. Aspects of A Digital Twin Framework

The embodiments disclosed herein are related to a digital twin framework that can be executed at a near-edge node such as the near-edge node 110. Accordingly, a short explanation of a digital twin network will now be given. In general, a digital twin is a digital representation of an intended or actual real-world physical product, system, or process that serves as the effectively indistinguishable digital counterpart of it for practical purposes, such as simulation, integration, testing, monitoring, and maintenance.

Figure 2:
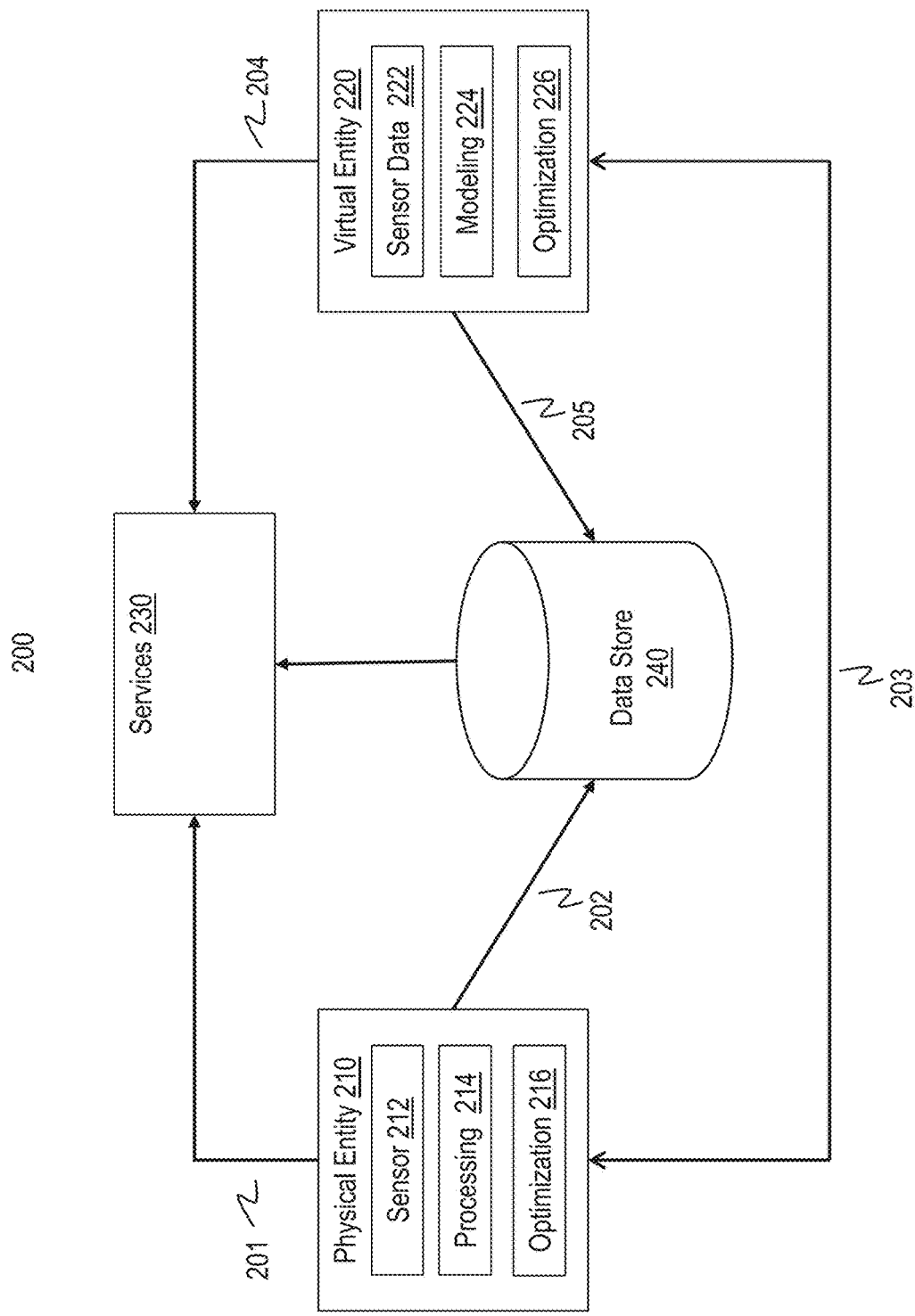
FIG. 2 discloses aspects of a digital twin network according to the embodiments disclosed herein.

FIG. 2 illustrates an embodiment of a digital twin network 200. As illustrated, the digital twin network 200 includes a physical entity 210 and a virtual entity 220 that is a digital twin of the physical entity 210. The digital twin network 200 also includes services 230 and data store 240. The physical entity 210 is a real world device such as an AMR or a smart forklift. Accordingly, the physical entity 210 includes, but is not limited to, sensors 212 for monitoring its operational environment and its operational parameters, processing capabilities 214 that allow the physical entity to process data so that it can perform a primary task such as moving supplies in a warehouse, and optimization capabilities 216 that are used to optimize its primary task. The physical entity 210 is also able to access various services 230 as shown at 201 that it uses in the performance of its primary task and is able to access the data store 240 as shown at 202 to access data as needed.

The virtual entity 220 is able to virtually represent the physical entity 210 by maintaining a communication channel 203 with the physical entity. Accordingly, the virtual entity 220 includes sensor data 222 that includes data obtained from the sensors 212. The virtual entity also includes modeling capabilities 224 and optimization capabilities 226. The virtual entity 220 is able to use the modeling capabilities 224 and optimization capabilities 226 to model and optimize the primary task and other operational aspects of the physical entity 210 to thereby allow a user to determine optimal perforce parameters for the physical entity 210, which can then be fed back to the physical entity 210. The virtual entity 220 can also access the services 230 as shown at 204 and the data store 240 as shown at 205 so as to mirror the services and data accessed by the physical entity 210.

C. Aspects of a Dynamically Informed Digital Twin Network

Figure 3:
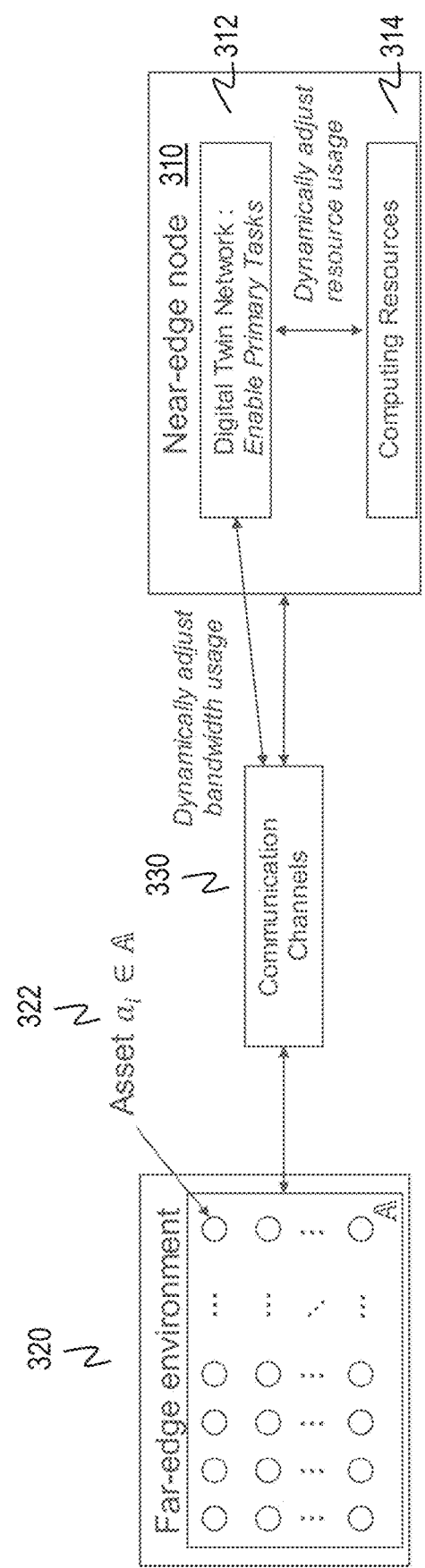
FIG. 3 discloses aspects of an edge environment that implements a digital twin network according to the embodiments disclosed herein.

FIG. 3 illustrates an embodiment of an edge environment 300 that may correspond to the edge environment 100 previously described. Accordingly, the edge environment 300 includes a near-edge node 310, that may correspond to the near-edge node 110, and a far-edge environment $\mathbb{A}$ 320 that includes various far-edge nodes, which may correspond to the far-edge nodes 130, referred as far-edge assets in FIG. 3. Accordingly, as shown at 322, each far-edge node is a far-edge asset $\alpha_i \in \mathbb{A}$. In the embodiment, the near-edge node 310 includes computing resources 314 that are used by the near-edge node to perform its primary tasks and may also be used by one or more of the far-edge assets 322. In addition, communication channels 330, which may be any reasonable wired or wireless communication channel, allow the near-edge node 310 to communicate with each of the far-edge assets 322.

In operation, however, the computing resources 314 and the bandwidth of the communication channels 330 may be limited. Accordingly, the principles of the embodiments disclosed herein provide for a dynamically informed digital twin network 312 to be implemented as the near-edge node 310. The dynamically informed digital twin network 312 includes virtual entities implemented at the near-edge node 310 that are the digital twins to physical entities that correspond to the each of the far-edge assets 322. Implementation of the dynamically informed digital twin network 312 allows the near-edge node 310 to dynamically adjust resource usage to reduce the impact on the primary tasks of the near-edge node and/or the various far-edge assets 322. In other words, use of the dynamically informed digital twin network 312 allows the near-edge node 310 to modify or adjust the amount of computing resources 314 that can be used by the near-edge node 310 and the various far-edge assets 322, commination channel bandwidth 330 that can be used by the near-edge node 310 and the various far-edge assets 322, and any data storage resources of the near-edge node 310 and/or the various far-edge assets 322 can also be instantiated or deallocated by the near-edge node 310 and the various far-edge assets 322. In particular, the dynamically informed digital twin network 312 dynamically adjusts the level of information acquired and processed within the network.

It will be noted that the dynamically informed digital twin network 312 may represent any arbitrary asset structure in the edge environment 300, thereby providing the means to enable any primary tasks to be executed with the environment information. Thus, the discussion of the embodiments disclosed herein will focus more on how the dynamically informed digital twin network 312 dynamically adjusts the information while reducing the impact on the primary tasks, rather than focusing on the specific way to execute the primary tasks, which can take the form that best suits the given edge environment 300.

Figure 4:
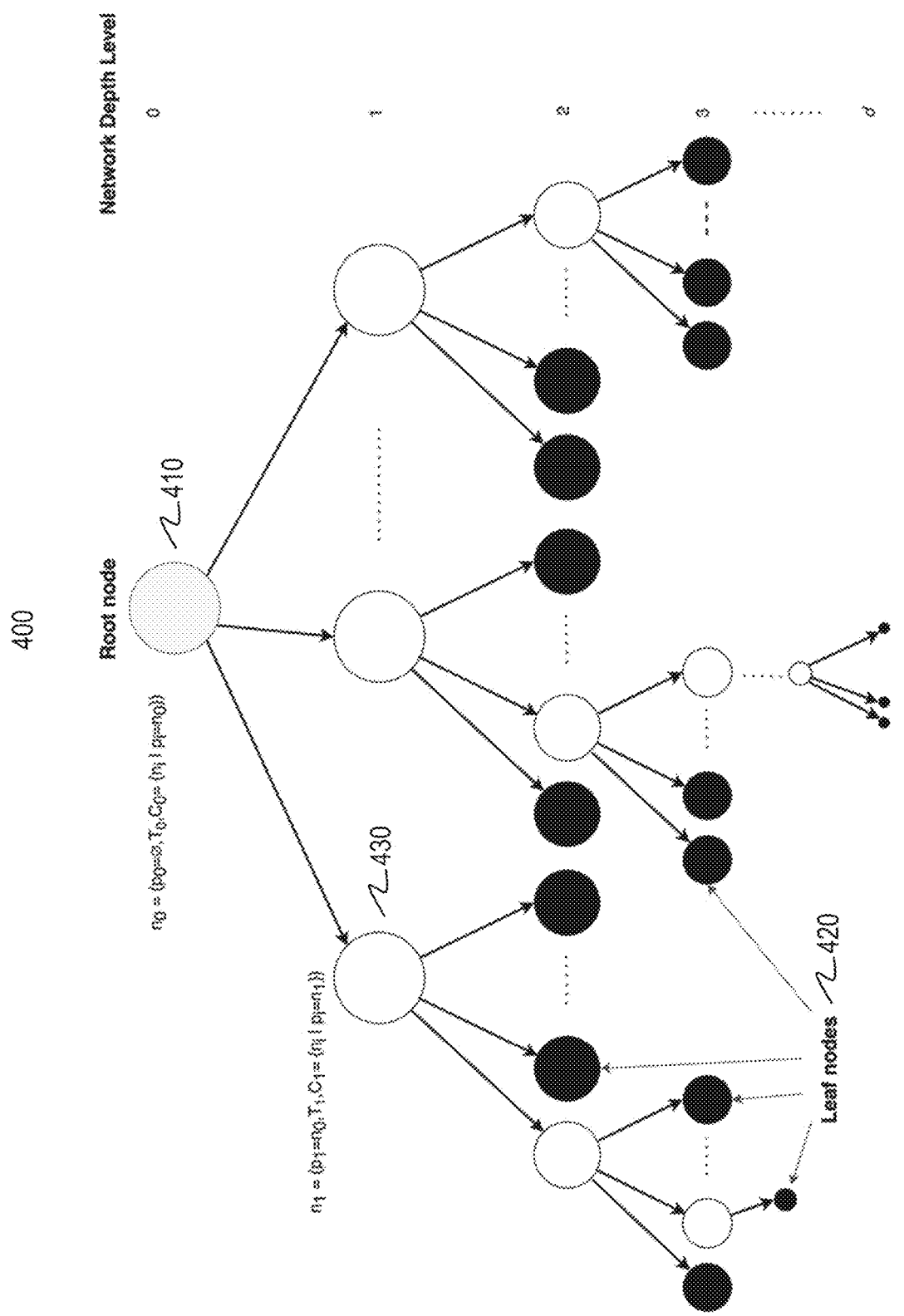
FIG. 4 discloses aspects of a structure of a digital twin network according to the embodiments disclosed herein.

FIG. 4 illustrates an embodiment of a structure of a dynamically informed digital twin network 400, which can be used to implement the dynamically informed digital twin network 312. In the dynamically informed digital twin network 400, the far-edge assets compose a form of a dependency network when considering their pre-defined roles in the edge environment. In one embodiment, the hierarchical aspects are nearly static, in such a way that most of the relationships between the far-edge assets are correctly captured without the need to frequently update the dynamically informed digital twin network 400. However, in some embodiments comprising more complex networks, more frequent updates may be made by leveraging on information from the far-edge nodes or using advanced computer vision methods. In the embodiment of the dynamically informed digital twin network 400, a formal definition of the digital twin network N with a node may be show as:

$$n_i = (p_i, T_i, C_i),$$

where $p_i$ is the parent node; $T_i$ is the twin unit of node $n_i$; and $C_i$ is a tuple of child nodes.

It will be noted that every node in the network N has a digital twin used to represent a given far-edge asset 322 $\alpha_i \in \mathbb{A}$ (in the leaf nodes 420 that are a solid dark color) or a set of assets (non-leaf nodes 430 that are a solid white color) which may also be composed of an asset itself. More complex digital twins can be used to represent systems-of-systems of twins. It is also noted that that the network definition is generic enough to comprise systems and system-of-systems of twins recursively with any arbitrary structure, complexity, and depth. Those are represented by the non-leaf nodes 430 in the FIG. 4. An example of such nodes can be production lines comprising AMRs or smart forklifts where these entities can have their own set of assets represented in the dynamically informed digital twin network 400 as child nodes. In the dynamically informed digital twin network 400, root node $n_0$ 410 has the lowest depth and represents the near-edge node 310 such that $T_0$ is the twin of the near-edge node.

C.1 Aspects of Contextual Variables

In the embodiments disclosed herein, there are two types of variables: (1) primary variables and (2) contextual variables. Primary variables are related to the primary task of the near-edge node 310 and/or the far-edge assets 322. For example, primary tasks of the near edge node 310 is monitoring and orchestrating the far-edge assets 322 in the far-edge environment 320 $\mathbb{A}$.

Contextual variables, on the other hand, represent relevant properties of the edge environment and are used in the embodiments disclosed herein to dynamically adjust resource usage in the edge environment. In some embodiments, the contextual variables may be interrelated with the primary variables. In some cases, the contextual variables are proxies to the quality, precision, or trustworthiness of the primary variables as usually one can trade-off these aspects to reduce strains in the system. In other cases, the contextual variables can also contain a subset of the primary variables themselves. Additionally, many sources of contextual variables can be defined considering application specificities.

Figure 5:
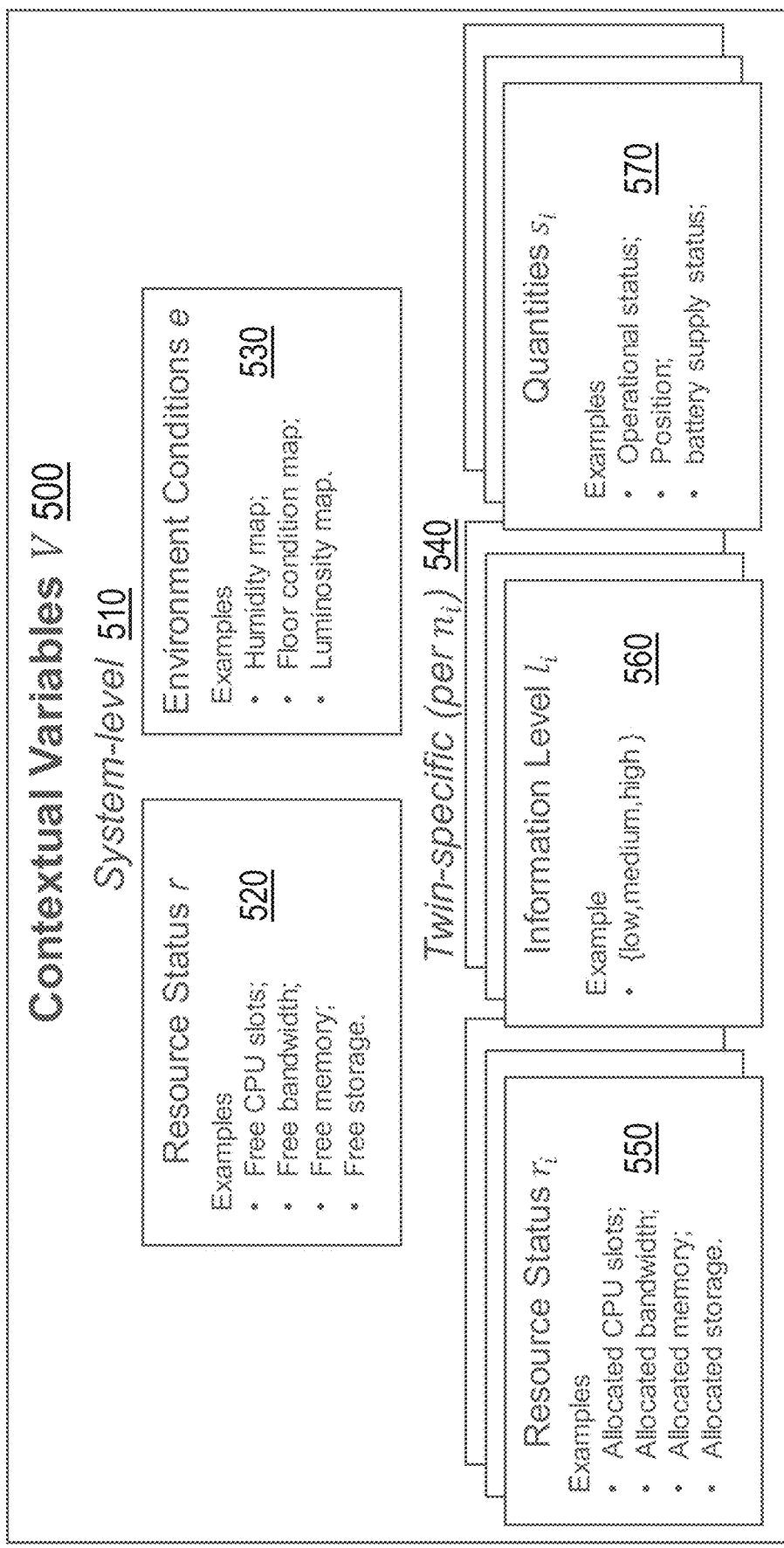
FIG. 5 discloses aspects of contextual variables according to the embodiments disclosed herein.

FIG. 5 illustrates one embodiment of contextual variables 500. As shown in Figure the contextual variables include system-level contextual variables 510 that represent information that applies across the entire edge environment and digital twin specific variables 540 that represent information that only applies to a particular digital twin (i.e., node) in the dynamically informed digital twin network 312 or 400. In the illustrated embodiment, the system-level contextual variables 510 include resource status variables 520 and environment condition variables 530. In the illustrated embodiment, the twin specific variables 540 include resource status or cost variables 550, an information level variable 560, and twin quantities variables 570. Each of the different contextual variables 500 will now be explained.

One of the system level contextual variables 510 are resource status $r_G$ variables 520. The resource status variables 520 define the current near-edge node 310 resource usage at the system level. It will be appreciated that the embodiments disclosed herein are not limited to any exact form of r as the resource status variables 520 variables depend on infrastructure implementation details, for example the computing capabilities can be represented as the number of free CPU slots or the number of nodes that a specific virtual machine instance type can be instantiated. However, the resource status variables 520 typically arise in smart environments and comprise the usage of bandwidth; processing capabilities; memory; and storage. It is assumed that $r_G \in (\mathbb{R}^{0+})^{n_r}$ is a good general assumption for most applications considered by the embodiments disclosed herein, where $\mathbb{R}^{0+}$ denotes the set of non-negative real numbers and $n_r$ the number of resources within the application.

Another of the system level contextual variables 510 are environment conditions e variables 530. The environmental conditions variables 530 specify the global environment status, as measured by a physical entity, or modelled by the virtual entity. Examples are humidity, floor condition, luminosity, etc. It will be appreciated that the embodiments disclosed herein are not limited to any exact form of the environmental conditions variables 530 as these variables can take any reasonable form according to application needs. In some embodiments, the environmental conditions variables 530 can be represented as a grid map or in a hierarchical tessellation structure.

One of the twin-specific contextual variables 540 are twin resource status or cost $c_i \in (\mathbb{R}^{0+})^{n_r}$ variables 550. The resource use or cost variables 550 specify the resource use of a specific far-edge asset 322 such as allocated CPU slots, bandwidth, memory, and storage. In addition, the resource use or cost variables 550 specify the relevant costs to the system due to the specific far-edge asset 322. Like the system-level contextual variables 510, the embodiments disclosed herein are not limited to specific forms for the resource use or cost variables 550. However, in some embodiments these variables are specified in the same form as the system-level resource status variables 520.

Another of the twin-specific contextual variables 540 is the twin information level $l_i \in L_i$ variable 560. The twin information level variable 560 defines the level-of-detail employed by the twin in the acquisition and processing of information. Therefore, the twin information level variable 560 defines a trade-off between the system performance in the execution of the primary tasks and the costs of the specific far-edge asset 322 (and, therefore, system) resource usage. In the illustrated embodiment, the possible information levels $L_i$ are in increasing order: low, medium, high. However, in other embodiments multiple variables can be employed to provide as much granular control as required.

A further of the twin-specific contextual variables 540 are twin quantities $q_i$ variables 570. The twin quantities variables 570 specify the quantities of the assets 322 and/or their quality, precision, or trustworthiness, as measured by the physical entity, or modelled by the virtual entity. Examples of the twin quantities variables 570 are operational status, position in the environment, battery supply status, etc. Additional variables representing the properties of the environment conditions about the asset can be added: the number of other assets in the surroundings, and local quantities of the environment conditions. An example of a proxy to the quality, precision or trustworthiness is the last time a variable was updated.

C.2 Aspects of a Dynamically Informed Digital Twin

Figure 6:
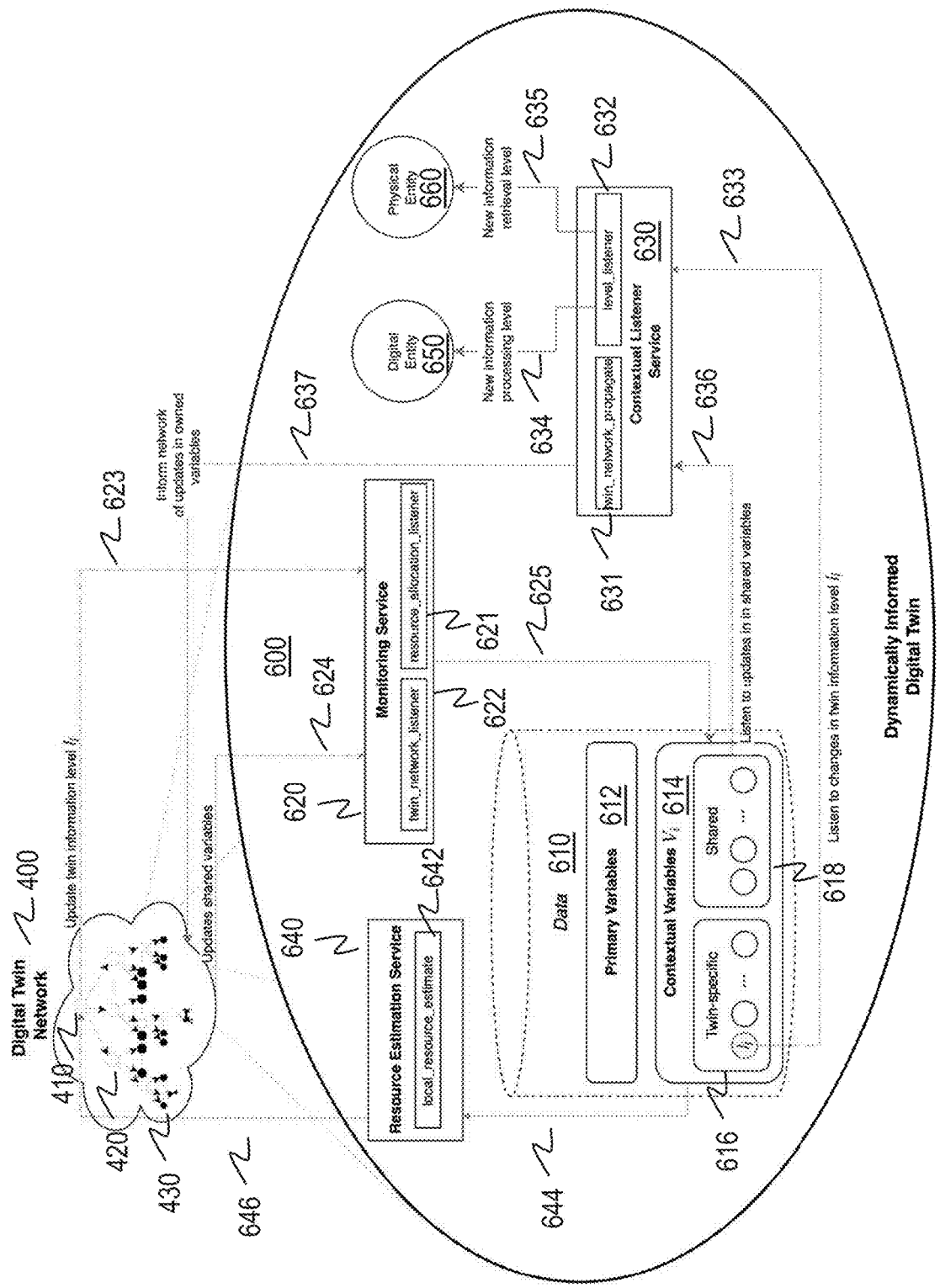
FIG. 6 discloses aspects of a dynamically informed digital twin according to the embodiments disclosed herein.

FIG. 6 illustrates an embodiment of a dynamically informed digital twin 600. In the embodiments disclosed herein, a dynamically informed digital twin 600 represents the most basic digital twin unit capable of providing the required dynamics in resource usage in the dynamically informed digital twin network 312 or 400 that is implemented at the near-edge node 310. The dynamically informed digital twin 600 may be implemented in the structure of the dynamically informed digital twin network 400 previously described. In the embodiments disclosed herein, all of the nodes 410, 420, and 430 will be represented by a dynamically informed digital twin 600. As will be explained in more detail to follow, the root node 410 (i.e., the digital twin of the near-edge node 310) will also include additional elements. The framework of a dynamically informed digital twin 600 will now be explained.

As shown in FIG. 6, the framework of a dynamically informed digital twin 600 unit $T_i$ includes data storage 610 that stores primary variables 612, which may correspond to the primary variables previously described and are related to the primary task of the near-edge node 310 and/or the far-edge assets 322. The data storage 610 also stores contextual variables 614, which may correspond to the contextual variables 500 previously described. In some embodiments the primary and contextual variables are segmented in the data storage 610 according to their entity of origin.

As mentioned, the contextual variables 614 may correspond to the contextual variables 500 previously described. Thus, the contextual variables include twin-specific contextual variables 616 which may correspond to the twin-specific contextual variables 540 previously described. The twin-specific contextual variables 616 include information specific to a particular node in the digital twin network. These can be measured directly by a physical entity such as physical entity 660 or computed by the virtual or digital entity such as digital entity 650. It will be appreciated that although the physical entity 660 is shown as being part of the dynamically informed digital twin 600, this is for ease of illustration only as the physical entity 660 is an actual physical entity that exists in the real world.

The contextual variables 614 also include a subset of variables that are shared contextual variables $s_i$ 614. The shared contextual variables $s_i$ 614 are contextual variables shared with a set of other nodes (e.g., nodes 410, 420 and 430) $S_i \subseteq N \backslash T_i$ in the dynamically informed digital twin network 400. The shared contextual variables $s_i$ 614 can include the system-level contextual variables 510 and may be assigned to be accessed anywhere within the dynamically informed digital twin network 400. Other variables from specific nodes can also be made available in an arbitrary node whenever appropriated. Parent and child nodes are likely sources of the shared contextual variables $s_i$ 614. In some embodiments, the shared contextual variables $s_i$ 614 are classified as: (1) Owned variables which are $s_i$ variables where $T_i$ is the responsible for computing the variable and sending the updates to set of other nodes $S_i$; and (2) Listened variables which are $s_i$ variables where $T_i$ just receives updates from the digital twin network.

The dynamically informed digital twin 600 also includes a number of services that are used in dynamically controlling the resource usage. For example, the dynamically informed digital twin 600 includes a monitoring service (MS) 620. In operation, the monitoring service 620 monitors other far-edge nodes 420 and 430 and the near-edge node 410 for updates. Accordingly, the monitoring service 620 includes a resource_allocation_listener module 621. The resource_allocation_listener module 621, as shown at 623, monitors communication between the dynamically informed digital twin 600 and the digital twin of the near-edge node 410 for updates to the twin information level $l_i$ 560. The resource_allocation_listener module 621 also adjusts the twin information level $l_i$ 560 when changes are monitored as shown at 625.

The monitoring service 620 also includes a twin_network_listener module 622. The twin_network_listener module 622, as shown at 624, monitors updates from the contextual listener services of other nodes S i (e.g., nodes 410, 420 and 430) in the dynamically informed digital twin network 400 for updates to any shared contextual variables 618. The twin_network_listener module 622 ensures that any updates are recorded in the data storage 610 as shown at 625.

The dynamically informed digital twin 600 also includes a contextual listener service (CLS) 630. The contextual listener service 630 includes a level_listener module 632. In operation, the level_listener module 632 accesses any changes to the twin information level $l_i$ 560 in the data storage 610 as shown at 633. The level_listener module 632 then maps the changes in the twin information level $l_i$ 560 to the physical entity 660, which is the far-edge asset 322 being represented by the dynamically informed digital twin 600, by adapting the information retrieval methods used by the far-edge asset as shown at 635. Examples of adapting the information retrieval methods include, but are not limited to, turning on or off a sensor at the far-edge asset, changing the sampling rate of a sensor, turning on or off an algorithm at the far-edge asset that controls how information is retrieved, and turning on or off a soft sensor technique.

The level_listener module 632 also maps the changes in the twin information level $l_i$ 560 to the virtual or digital entity 650, which is the digital twin representation of the far-edge asset, by modifying information processing methods of the virtual or digital entity 650 as shown at 634. Examples of modifying the information processing include, but are not limited to, switching modelling behaviors to rely on different algorithms (e.g., to rely on different information patterns), adjusting modelling algorithms parameters, switching modelling algorithms on or off, and changing modelling algorithms computation frequency and/or latency.

The contextual listener service 630 also includes a twin_network_propagate module 631. In operation, as shown at 636, the twin_network_propagate module 631 accesses any changes to the shared variables 618 in the data storage 610. The twin_network_propagate module 631 then communicates the updated shared variables through the dynamically informed digital twin network 400 by informing the monitoring services of the other nodes $S_i$ (e.g., nodes 410, 420 and 430) in the digital twin network as shown at 637.

The dynamically informed digital twin 600 also includes a resource estimation service (RES) 640. The resource estimation service 640 includes a local_resource_estimate module 642. In operation, the local_resource_estimate module 642, as shown at 644, accesses the updates to the contextual variables 614, in particular the twin information level $l_i$ 560, parses them, and computes possible operation scenarios and their risks to the operation of the dynamically informed digital twin 600.

In one embodiment, the local_resource_estimate module 642 has a function which has a generic form $\{(l_j, v_j, c_j, r_j)|l_j \in L_i,\} = \text{resource\_estimate}(V_i)$. The function has as input the contextual variables V 614 (or a subset thereof) and outputs a map of the possible $v_j$ operational points in the twin information level $L_i$ 560 to a cost $c_j \in \mathbb{R}^{n_r}$ and risk $r_j \in \mathbb{R}^{0+}$. It will be noted that the cost has the same support space of the system-level resource contextual variable r 520. It will also be noted that the costs and risks determined by the local_resource_estimate module 642 include estimates of transitory effects due to the potential reallocation of resources. For instance, the determined risks consider estimated latencies in the allocation of resources and costs associated.

The local_resource_estimate module 642, as shown at 646, provides the determined risks and costs to a resource allocation service 720 (see FIG. 7) of the digital twin of near-edge node 410 as will be explained in more detail to follow. The local_resource_estimate module 642 will typically provide the determined risks and costs to the resource allocation service 720 at regular time intervals. However, the in some instances the local_resource_estimate module 642 can make a demand to the digital twin of near-edge node 410 when the dynamically informed digital twin 600 requires an urgent increase in the twin information level $L_i$ 560 to maintain safe or vital operation.

In some embodiments, the dynamically informed digital twin 600 can be defined as a minimal tuple $$DYDT = (D, S)$$

with D being the dynamically informed digital twin 600 data storage 610 and S a tuple of services with minimal form S=(MS, CLS, RES), MS is the monitoring service 620, CLS is the contextual listener service 630, and RES is the resource estimation service 640. Although not shown, the dynamically informed digital twin 600 can also include other elements and services as needed.

C.3 Aspects of a Near-Edge Digital Twin

Figure 7:
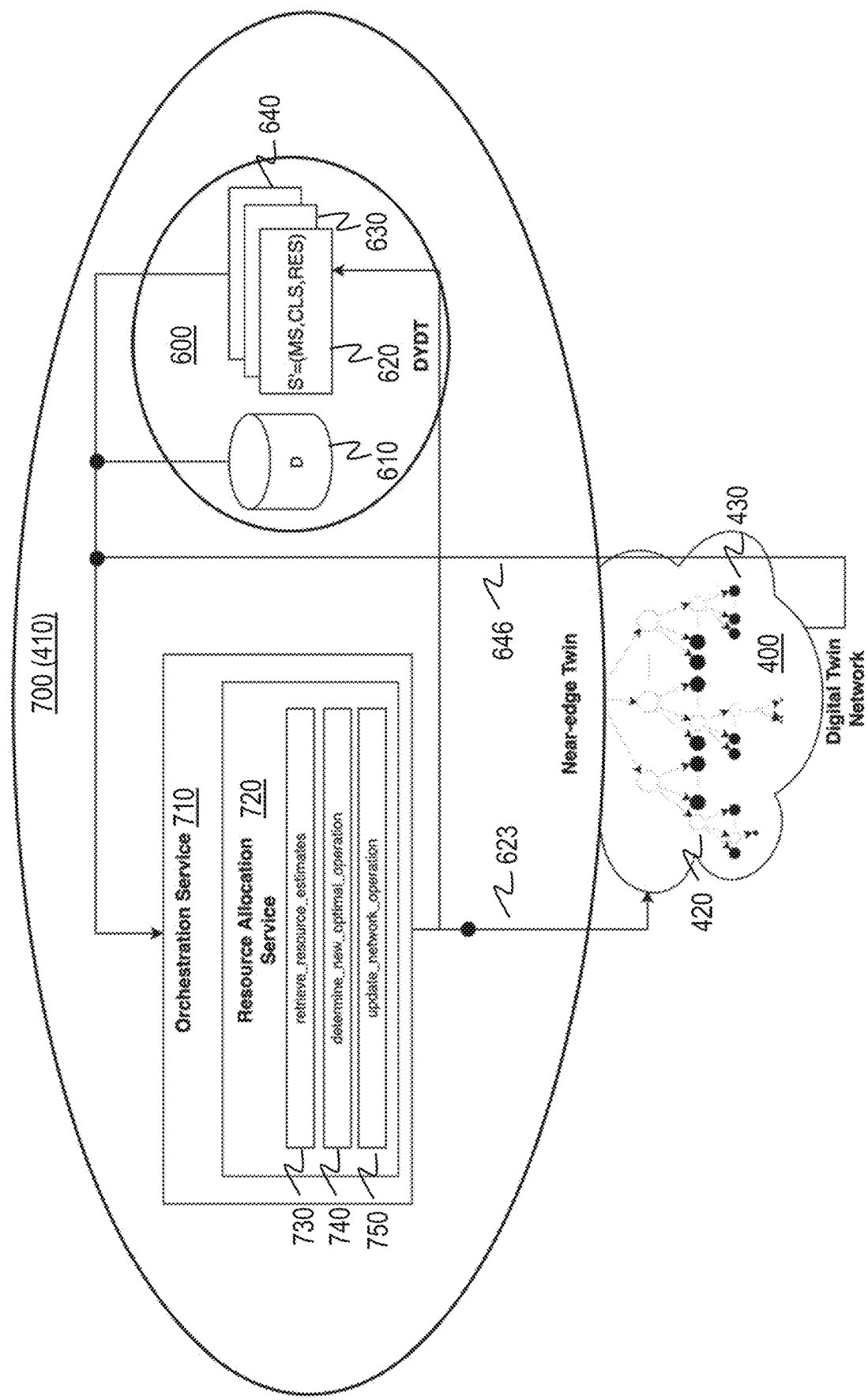
FIG. 7 discloses aspects of near-edge digital twin according to the embodiments disclosed herein.

FIG. 7 illustrates an embodiment of a near-edge digital twin 700. In the embodiments disclosed herein, a near-edge digital twin 700 represents the root node in the dynamically informed digital twin network 312 or 400 that is implemented at the near-edge node 310. Accordingly, when the digital twin network is implemented as the structure of the dynamically informed digital twin network 400 previously described, the near-edge digital twin 700 represents the root node 410.

As previously discussed, all nodes of the dynamically informed digital twin network 400 including the root node 410 include the dynamically informed digital twin 600 framework. Accordingly, the a dynamically informed digital twin 600 framework is shown as being included in the near-edge digital twin 700. The dynamically informed digital twin 600 of the near-edge digital twin 700 includes the elements and operates in the manner previously described in relation to FIG. 6.

In the embodiments disclosed herein, the near-edge digital twin 700 is the single digital twin responsible for providing orchestration services for the dynamically informed digital twin network 312 or 400. Accordingly, the near-edge digital twin 700 includes an orchestration service 710 that performs the orchestration services. The orchestration service 710 includes a resource allocation service (RAS) 720 that is used during orchestration.

In the embodiment, the resource allocation service 720 operates mostly in regular time intervals. The frequency of the updates defines a trade-off between the fine-tuning of resource requirements at the expense of availability of resources for the primary tasks performed by the near-edge node and/or the far-edge nodes or assets. While the time interval that is implemented is application specific, periodic updates around 0.1 s, 1 s and 5 s are typical in some embodiments. However, the embodiments disclosed herein are not limited to any particular time interval of the resource allocation service 720.

As illustrated, the resource allocation service 720 includes a retrieve_resource_estimates (N) module 730, which in operation retrieves all sets of information levels, costs, and associated risks of the digital twins in the dynamically informed digital twin network 400. That is, as described in relation to FIG. 6, the resource allocation service 720 as shown at 646 receives the information levels, costs, and associated risks from each resource estimation service 640 of each dynamically informed digital twin 600. The retrieve_resource_estimates(N) module 730 then builds two dictionaries C and R respectively mapping the digital twins and operation points to costs and associated risks, for example $C(T_i, l_j)=c_{i,j}$ and $R(T_i, l_j)=r_{i,j}$. A third dictionary L returns the position of the current information level in $L_i$ and the information level for each digital twin $T_i$, i.e., $L(T_i)=(p_i, l_i)$.

The resource allocation service 720 also includes a determine_new_optimal_operation(L, C, R, r) module 740, which takes as inputs the outputs of the retrieve_resource_estimates module 730 together with the current resource usage status r and determines a new information levels $l_{new}$. In one embodiment, the optimal information levels l* can be formulated as a constrained optimization problem, i.e.

$$p^* = \arg\max_p \sum_i R(T_i, p_i) \text{ subject to } \sum_i C(T_i, p_i) \le r_G$$

where $p=\{p_0, \ldots, p_{|N|}\}$ are the indexes of the information levels of twins in the network. Then $L_{new}$ is the updated version of L mapping to p* and the respective information levels.

This leads to a combinatorial problem where several approaches can be employed. A particularly simple one leverages on the expectations that not all digital twins should change at once, therefore reducing the possibilities to information levels that are close to the initial information levels. This is a good approximation when the resource allocation service 720 operates in relatively small update intervals with respect to the change in dynamics in the environment. Approaching the problem this way, an algorithm can be defined as follows:

1. Let $p=\{L(T_i)[0] \mid T_i \in N\}$; i.e., set initial p equal to current operation level for all twins. If there are multi-dimensional $L_i$ in the network, i.e., there are more than type of level to choose for the twin $T_i$, then split each dimension $L_i$ as a particular dimension in p, i.e., $p=\{L(T_i)[0][j] \mid T_i \in \{0, \ldots, \text{len}(L_i)\}\}$, where len returns the number of dimensions (here we assume $L_i$ to form a tuple of tuples).
2. Repeat Retrieve $c_+=C(T_i, p_i+1)$ corresponding to the cost of a one-level increase in the information levels, $c_-=C(T_i, p_i-1)$ the analogous variable for a decrease in information level and $c=C(T_i, p_i)$. If $p_i+1$ or $p_i-1$ is invalid, set the value to a placeholder indicating that the choice is invalid, i.e., a possible option is to use "not a number".

Likewise, retrieve $r_+$, $r_-$ and r;

Compute $\Delta_{c+}=c_+-c$, $\Delta_{c-}=c_--c$, $\Delta_{r+}=r_+-r$, and $\Delta_{r-}=r_--r$;

An increase in information levels should yield maximum risk reduction with respect to cost increase. On the other hand, a decrease in information level should yield maximum release of resources per risk increase. It is noted that cost and resources are multi-dimensional, therefore statistics should be employed for comparison purposes. The vectors are normalized with respect to the maximum, i.e., $\widehat{\Delta_{c+}}=\Delta_{c+}/c_{max}$ and so forth, and take the $s(\widehat{\Delta_{c+}})=\Sigma \widehat{\Delta_{c+}}$ as a summary measure of the changes. The following are then computed:

$\text{roc}=-s(\widehat{\Delta_{r+}})/s(\widehat{\Delta_{c+}})$, representing the risk-over-cost gains when increasing an information level.

$\text{cor}=-s(\widehat{\Delta_{c-}})/s(\widehat{\Delta_{r-}})$, representing the cost-over-risk gains when decreasing an information level.

Retrieve the twins that locally results in the best marginal gains in risk.

$i_+=\{i \mid \text{roc}_i > \text{roc}_{min}\}$, where $\text{roc}_{min}$ determines a minimal value in which it is worth increasing information levels and allows to avoid operations due to error in estimations.

$i_-=\{i \mid \text{cor}_i > \text{cor}_{min}\}$ where $\text{cor}_{min}$ results in a similar effect to $\text{roc}_{min}$ during operation, but for decreasing information levels.

Resolve any $i_+ \cap i_-$ ambiguity by keeping the twin index in the list resulting in maximum benefits by comparing cor and roc directly.

If $i_+$ and $i_-$ are not empty:

Apply $p[i_-]-=1$ and $p[i_+]+=1$. Return to step 2 (repeat the loop).

Otherwise, break the loop (go to step 3).

3. Evaluate if the constraints are satisfied, i.e., $\Sigma_i C(T_i, p_i) \le r_G$:

If not satisfied, repeat step 2 until conditions get satisfied, but only seeking $i_-$ in the resources that exceeds the limits.

4. Build dictionary $L_{new}$ from final p.

The resource allocation service 720 also includes an update_network_operation(N, $L_{new}$) module 750. The module 750 updates the information levels of each dynamically informed digital twin 600 by providing the updated information levels to the monitoring service 620 of dynamically informed digital twin 600 as shown at 623. As described in relation to FIG. 6, the contextual listener service 630 of each dynamically informed digital twin 600 then operate to inform the physical entity 660 of the new information level and the virtual entity 650 to use updated modeling schemes based on the new information level.

As discussed previously, in some embodiments the resource estimation service 640 of a dynamically informed digital twin 600 may send an urgent demand to the resource allocation service 720 when the an urgent increase in the twin information level $L_i$ 560 is needed to maintain safe or vital operation. In such cases, resource allocation service 720 skips the retrieve_resource_estimates module 730 and does the computation of the optimal operation considering the last retrieved information.

D. Use Examples of a Dynamically Informed Digital Twin Network

The embodiments disclosed herein of the dynamically informed digital twin network 312 and 400 can be applied to a resource constrained edge environment 300 to allow efficient operation of the environment. Example uses of the digital twin networks will be explained in an example considering primary tasks of the near-edge node of monitoring the far-edge assets, orchestration of the far-edge assets, and maintenance tasks of the far-edge assets. In the examples, the far-edge assets are AMRs that have a dynamically informed digital twin 600 implemented on the near-edge node in the manner previously described.

Suppose that the following maintenance levels (i.e., twin information level l ti 560 for different maintenance routines) are available that can be employed by the virtual entity 650 of an AMR in the digital network:

Maintenance Level 1: preventive maintenance after n D hours of operation, where $n_D$ is specified by the asset manufacturer.

Maintenance Level 2: condition-based maintenance based on threshold data. A health indicator from the device is estimated based on the inner operation properties. This requires historical data to obtain or improve the health indicator model, that is collected periodically from all devices set to this information level. This level requires more computational resources than Maintenance Level 1.

Maintenance Level 3: predictive maintenance using machine learning, e.g., with hidden Markov models or any other appropriate model known to those skilled in the art. This level requires more computational resources than Maintenance Level 2.

Maintenance Level 4: prescriptive maintenance using causal modeling, or any other appropriate model known to those skilled in the art.. Such methods require the generation of counterfactuals which rely on large data availability (potentially based on simulation techniques) and heavy computational methods capable of approximating the underlying distribution of the smart environment operation. This level requires more computational resources than Maintenance Level 4.

Concerning orchestration, suppose that the path finding levels (i.e., twin information level $l_i$ 560 for different path finding models) are available:

Path Model Level 1: move to checkpoint, no data collection and processing.

Path Model Level 2: move to checkpoint and collect/process information of its surrounding using basic sensors/models. This level requires more computational resources than Path Model Level 1.

Path Model Level 3: move to checkpoint and collect/process information of its surrounding using all sensors available in a neighborhood and more complex models capable of integrating all the information in a reliable way. This level requires more computational resources than Path Model Level 2.

Path Model Level 4: move to checkpoint as in Path Model Level 3, but with the generation of counterfactuals to avoid potentially dangerous paths. This level requires more computational resources than Path Model Level 3.

It is assumed that the near-edge node monitors the environment using computer-vision algorithms. Such task may have the following information levels (i.e., twin information level $l_i$ 560 for different monitoring algorithms:

Monitoring Model Level 1: do not monitor the environment.

Monitoring Model Level 2:sample a limited number of image feeds (sampling may include some intelligence algorithm to increase efficiency) and perform identification of most crucial security related algorithms. This level requires more computational resources than Monitoring Model Level 1.

Monitoring Model Level 3: sample limited number of image feeds and perform all computer-vision algorithms. This level requires more computational resources than Monitoring Model Level 2.

Monitoring Model Level 4: perform all computer-vision algorithms on all feeds. This level requires more computational resources than Monitoring Model Level 3.

It is assumed that the resource requirements can be easily acquired for each information level by setting a far-edge assets 322 to the different information levels and deriving useful statistics of its resource usage during operation while maintaining the other the far-edge assets 322 in a stable operation.

D.1 Dynamically Informed Maintenance Solution

D.1.1 Early Transitory Operation

It is first illustrated how the dynamically informed digital twin network can be useful in an early application stage, where historical maintenance data is not collected and is of crucial importance to reduce the operational risk. In such scenarios, the AMRs typically cannot afford of the modeling schemes of Maintenance Level 2, Maintenance Level 3, and Maintenance Level 4 due to the lack of historical data, but by setting to each of these information levels it can be ensured that the network collects data that can be used to derive modelling schemes to the respective information level. However, the network can benefit from the simpler maintenance approaches as soon as possible, while taking advantage of available resources to collect data for more advanced maintenance levels whenever possible.

The embodiments disclosed herein allow the network to obtain the desired behavior by smartly defining the risk values previously described. The network can favor data collection to provide a Maintenance Level 2 model as soon as possible, and ensure that while Maintenance Level 2 model is not available, if additional resources are available, the network favors collecting data for a Maintenance Level 3 model by setting the risk values of Maintenance Level 2, Maintenance Level 3, and Maintenance Level 4 to the same value. Therefore, whenever resources are available, the resource allocation service is able to find that it is better to promote as many digital twins to Maintenance Level 2 as possible before upgrading a single digital twin to Maintenance Level 3, with the same behavior for Maintenance Level 4.

D.1.2 Steady Operation

An edge environment is now considered where data has already been collected to train the models required for all information levels. Suppose that the edge environment is composed of a fleet of AMRs that is composed of operating and idle devices. The following application scenarios may apply:

The R values for the idle AMR twins can be set to low values for Maintenance Level 1, Maintenance Level 2, Maintenance Level 3, and Maintenance Level 4, privileging their information level to be set to Maintenance Level 1 and the resources to be allocated for other purposes.

As soon as a far-edge asset 322 is set to operation, the risk of employing the lower maintenance information levels can be set to higher values, therefore requiring resources to be allocated.

For the operating far-edge asset 322, policies relying on relevant contextual variables 500 can be derived, for example, it could be set that devices running for many consecutive hours, lower value for the last predicted health indicator or under heavier work conditions are subject to higher risks when not using higher information levels.

Likewise, the risk policy can also rely on time since the last time the AMR digital twin benefited from higher information level maintenance types. The policy can increase the risk of Maintenance Level 3 and Maintenance Level 4 based on the amount of time that the device is operating on Maintenance Level 4, favoring that the device is eventually chosen to benefit from Maintenance Level 3 or Maintenance Level 4. After operating in Maintenance Level 3 or Maintenance Level 4 for a minimal value for the analysis to be effective, the risk of operating in Maintenance Level 4 can be set again to low values, allowing the resources to be employed for another AMR that has been operating in Maintenance Level 2 for long periods.

D.2 Dangerous Cornering Events

Suppose a scenario where a large fleet of AMR assets are roaming in the edge environment, eventually generating dangerous cornering events as the AMRs come close to each other. In such scenarios, contextual variables 500 can be used as the distance between assets and ray casting operation by leveraging global environment condition variables e in the policies to determine a path finding algorithm. Examples are:

Set lower Path Model information levels to high-risk values whenever two assets are near to each other and there is no direct ray casting from one AMR to the other one, therefore privileging these assets to benefit from higher Path Model information.

The risks can be set to be inversely proportional to the function of the distance, therefore allowing the dynamic change of Path Model algorithms and reducing the likelihoods of collisions to occur.

Heuristics can be employed considering safety standards, for example whenever the distance is lower than a threshold and a pre-determined Path Model level is not being employed, make an urgent request setting the risk of all other Path Model levels to high values.

In extreme cases where no other resources can be released, some AMRs where contextual variables 500 show minor risk of free navigation can be set to navigate using Path Model Level 1, and allow their resources to be employed for Path Model Level 2 or Path Model Level 3 in the dangerous cases.

Like the maintenance case, policies can determine time-based dynamics, allowing the near-edge node to dynamically switch privileged assets and ensure that all devices eventually benefit from better information levels. This can also be useful in dangerous cornering events, to enhance the possibilities where resources can be safely deallocated and used in other critical scenarios. For instance:

The risk to switch for Monitoring Model Level 1 or Monitoring Model Level 2 can decay as a function of time operating in Monitoring Model Level 3 or Monitoring Model Level 4, therefore allowing the near-edge node to use such resources whenever critical scenarios such as dangerous cornering events can happen.

While operating in Monitoring Model Level 1 and Monitoring Model Level 2, the risk of not switching to Monitoring Model Level 3 or Monitoring Model Level 4 can be set to increase as a function of time, therefore prioritizing the resources to be reallocated as soon as possible to such conditions.

E. Example Methods

Figure 8:
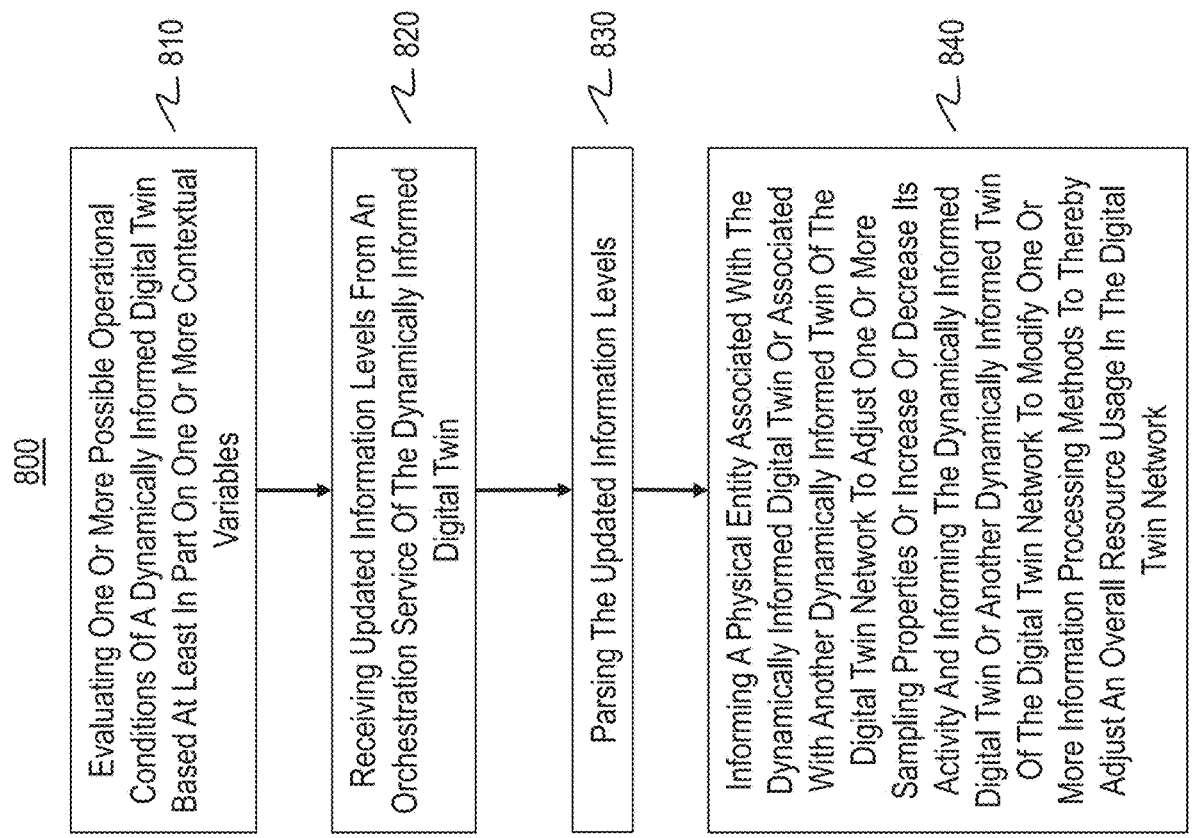
FIG. 8 discloses a flow chart of a method for adjusting overall resource usage in a digital twin network that includes a dynamically informed digital twin.

It is noted with respect to the disclosed methods, including the example method of FIG. 8, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 8, an example method 800 for adjusting overall resource usage in a digital twin network that includes a dynamically informed digital twin of a near-edge node and a dynamically informed digital twin of a plurality of far-edge nodes is disclosed. The method 800 will be described in relation to one or more of the figures previously described, although the method 800 is not limited to any particular embodiment.

The method 800 includes evaluating one or more possible operational conditions of a dynamically informed digital twin based at least in part on one or more contextual variables that represent operating properties of the dynamically informed digital twin (810). For example, as previously described the resource estimation service 640 evaluates the possible operational conditions of the dynamically informed digital twin 600 based at least in part on the contextual variables 500.

The method 800 includes receiving updated information levels from an orchestration service of the dynamically informed digital twin, the updated information levels defining an amount of resources the dynamically informed digital twin will use in the performance of one or more primary tasks (820). For example, as previously described the monitoring service 620 receives the twin information levels variable 560 from the orchestration service 710.

The method 800 includes parsing the updated information levels (830). For example, as previously described the contextual listener service 630 parses the received updated information levels variable 560.

The method 800 includes informing a physical entity associated with the dynamically informed digital twin to adjust one or more sampling properties or increase or decrease its activity and informing the dynamically informed digital twin to modify one or more information processing methods to thereby adjust the overall resource usage in the digital twin network (840). For example, as previously described the contextual listener service 630 informs the physical entity 660 to adjust its sampling properties and to increase or decrease its activity and informs the digital entity 650, which represents the modeling capabilities of the dynamically informed digital twin, to modify its information processing methods.

F. Further Example Embodiments

Following are some further example embodiments of the invention. These are presented only by way of example and are not intended to limit the scope of the invention in any way.

Embodiment 1. A method for adjusting overall resource usage in a digital twin network, the digital twin network including a dynamically informed digital twin of a near-edge node and a dynamically informed digital twin of a plurality of far-edge nodes, the method comprising: evaluating one or more possible operational conditions of a dynamically informed digital twin based at least in part on one or more contextual variables that represent operating properties of the dynamically informed digital twin; receiving updated information levels from an orchestration service of the dynamically informed digital twin, the updated information levels defining an amount of resources the dynamically informed digital twin will use in the performance of one or more primary tasks; parsing the updated information levels; and informing a physical entity associated with the dynamically informed digital twin to adjust one or more sampling properties or increase or decrease its activity and informing the dynamically informed digital twin to modify one or more information processing methods to thereby adjust the overall resource usage in the digital twin network.

Embodiment 2. The method of embodiment 1, further comprising: at the orchestration service of the dynamically informed digital twin: receiving from each dynamically informed digital twin the one or more possible operational conditions; determining the updated information levels; and providing the updated information levels to each dynamically informed digital twin.

Embodiment 3. The method of embodiments 1-2, wherein adjusting one or more of the sampling properties of the physical entity comprises one or more of turning on sensor, turning off a sensor, changing a sampling rate, turning on a machine learning algorithm, or turning off a machine learning algorithm.

Embodiment 4. The method of embodiments 1-3, wherein adjusting the one or more information processing methods of the dynamically informed digital twin comprises one or more of adjusting a machine learning modelling algorithm, adjusting modelling parameters, changing the frequency or latency of the machine learning algorithms, turning on a machine learning algorithm, or turning off a machine learning algorithm.

Embodiment 5. The method of embodiments 1-4, wherein the contextual variables include system level contextual variables and dynamically informed digital twin specific contextual variables.

Embodiment 6. The method of embodiment 5, wherein the system level contextual variables include resource status variables for the digital twin network and environmental condition variables for the digital twin network.

Embodiment 7. The method of embodiment 5, wherein the dynamically informed digital twin specific contextual variables include resource status variables for the dynamically informed digital twin, information level variables, and quantities variables.

Embodiment 8. The method of embodiment 5, wherein a subset of the contextual variables are shared by the dynamically informed digital twin with one or more other dynamically informed digital twins of the digital twin network.

Embodiment 9. A system, comprising hardware and/or software, operable to perform any of the operations, methods, or processes, or any portion of any of these, disclosed herein.

Embodiment 10. A non-transitory storage medium having stored therein instructions that are executable by one or more hardware processors to perform operations comprising the operations of any one or more of embodiments 1-8.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, or the like may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 9:
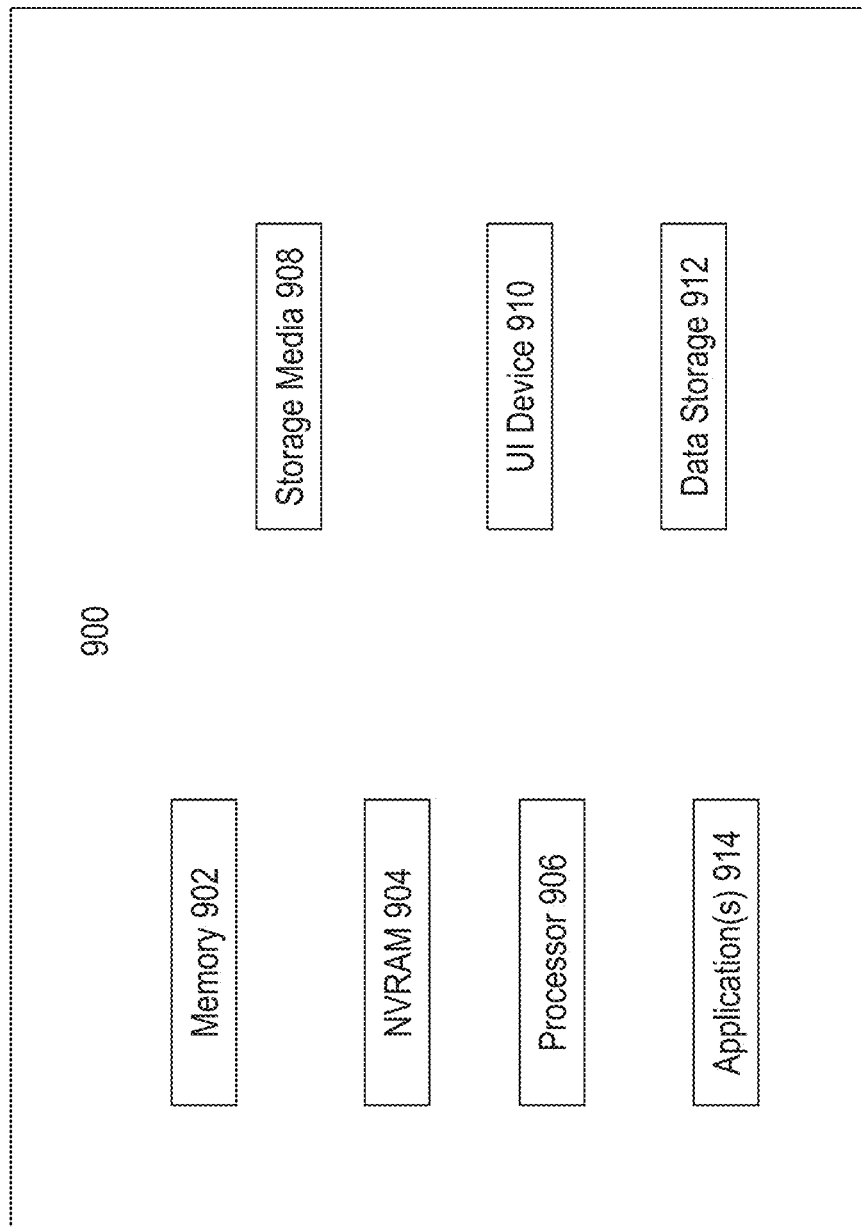
FIG. 9 illustrates an example computing entity operable to perform any of the disclosed methods, processes, and operations.

With reference briefly now to FIG. 9, any one or more of the entities disclosed, or implied, by the Figures and/or elsewhere herein, may take the form of, or include, or be implemented on, or hosted by, a physical computing device, one example of which is denoted at 900. Also, where any of the aforementioned elements comprise or consist of a virtual machine (VM), that VM may constitute a virtualization of any combination of the physical components disclosed in FIG. 9.

In the example of FIG. 9, the physical computing device 900 includes a memory 902 which may include one, some, or all, of random access memory (RAM), non-volatile memory (NVM) 904 such as NVRAM for example, read-only memory (ROM), and persistent memory, one or more hardware processors 906, non-transitory storage media 908, UI device 910, and data storage 912. One or more of the memory components 902 of the physical computing device 900 may take the form of solid-state device (SSD) storage. Also, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   a processor;
   non-transitory storage medium having stored therein computer executable instructions that, when executed by the processor, cause the computing system to perform the following:
   generate in the non-transitory storage medium a digital twin network, the digital twin network including a dynamically informed digital twin of a near-edge node and a dynamically informed digital twin of a plurality of far-edge nodes; and
   each dynamically informed digital twin comprising:
      a resource estimation service configured to evaluate one or more possible operational conditions of the dynamically informed digital twin based at least in part on one or more contextual variables that represent operating properties of the dynamically informed digital twin;
      a monitoring service configured to receive updated information levels from an orchestration service, the updated information levels defining an amount of resources the dynamically informed digital twin will use in the performance of one or more primary tasks; and
      a contextual listener service configured to parse the updated information levels and to inform a physical entity associated with the dynamically informed digital twin to adjust one or more sampling properties or increase or decrease its activity and to inform the dynamically informed digital twin to modify one or more information processing methods to thereby adjust an overall resource usage in the digital twin network.

2. The computing system of claim 1, wherein the dynamically informed digital twin of the near-edge node further comprises the orchestration service, the orchestration service comprising:
   a resource allocation service configured to:
   receive from each resource estimation service of each dynamically informed digital twin the one or more possible operational conditions;
   determine the updated information levels; and
   provide the updated information levels to the monitoring service of each dynamically informed digital twin.

3. The computing system of claim 1, wherein adjusting one or more of the sampling properties of the physical entity comprises one or more of turning on a sensor, turning off a sensor, changing a sampling rate, turning on a machine learning algorithm, or turning off a machine learning algorithm.

4. The computing system of claim 1, wherein adjusting the one or more information processing methods of the dynamically informed digital twin comprises one or more of adjusting a machine learning modelling algorithm, adjusting modelling parameters, changing a frequency or a latency of a machine learning algorithm, turning on a machine learning algorithm, or turning off a machine learning algorithm.

5. The computing system of claim 1, wherein the contextual variables include system level contextual variables and dynamically informed digital twin specific contextual variables.

6. The computing system of claim 5, wherein the system level contextual variables include resource status variables for the digital twin network and environmental condition variables for the digital twin network.

7. The computing system of claim 5, wherein the dynamically informed digital twin specific contextual variables include resource status variables for the dynamically informed digital twin, information level variables, and quantities variables.

8. The computing system of claim 5, wherein a subset of the contextual variables are shared by the dynamically informed digital twin with one or more other dynamically informed digital twins of the digital twin network.

9. A method for adjusting overall resource usage in a digital twin network, the digital twin network including a dynamically informed digital twin of a near-edge node and a dynamically informed digital twin of a plurality of far-edge nodes, the method comprising:
   evaluating one or more possible operational conditions of a dynamically informed digital twin based at least in part on one or more contextual variables that represent operating properties of the dynamically informed digital twin;
   receiving updated information levels from an orchestration service of the dynamically informed digital twin, the updated information levels defining an amount of resources the dynamically informed digital twin will use in the performance of one or more primary tasks;
   parsing the updated information levels; and
   informing a physical entity associated with the dynamically informed digital twin to adjust one or more sampling properties or increase or decrease its activity and informing the dynamically informed digital twin to modify one or more information processing methods to thereby adjust the overall resource usage in the digital twin network.

10. The method of claim 9, further comprising:
   at the orchestration service of the dynamically informed digital twin:
      receiving from each dynamically informed digital twin the one or more possible operational conditions;
      determining the updated information levels; and
      providing the updated information levels to each dynamically informed digital twin.

11. The method of claim 9, wherein adjusting one or more of the sampling properties of the physical entity comprises one or more of turning on a sensor, turning off a sensor, changing a sampling rate, turning on a machine learning algorithm, or turning off a machine learning algorithm.

12. The method of claim 9, wherein adjusting the one or more information processing methods of the dynamically informed digital twin comprises one or more of adjusting a machine learning modelling algorithm, adjusting modelling parameters, changing a frequency or a latency of a machine learning algorithm, turning on a machine learning algorithm, or turning off a machine learning algorithm.

13. The method of claim 9, wherein the contextual variables include system level contextual variables and dynamically informed digital twin specific contextual variables.

14. The method of claim 13, wherein the system level contextual variables include resource status variables for the digital twin network and environmental condition variables for the digital twin network.

15. The method of claim 13, wherein the dynamically informed digital twin specific contextual variables include resource status variables for the dynamically informed digital twin, information level variables, and quantities variables.

16. The method of claim 13, wherein a subset of the contextual variables are shared by the dynamically informed digital twin with one or more other dynamically informed digital twins of the digital twin network.

17. A non-transitory storage medium having stored therein instructions that are executable by one or more hardware processors to perform operations for adjusting overall resource usage in a digital twin network, the digital twin network including a dynamically informed digital twin of a near-edge node and a dynamically informed digital twin of a plurality of far-edge nodes, the operations comprising:
   evaluating one or more possible operational conditions of a dynamically informed digital twin based at least in part on one or more contextual variables that represent operating properties of the dynamically informed digital twin;
   receiving updated information levels from an orchestration service of the dynamically informed digital twin, the updated information levels defining an amount of resources the dynamically informed digital twin will use in the performance of one or more primary tasks;
   parsing the updated information levels; and
   informing a physical entity associated with the dynamically informed digital twin to adjust one or more sampling properties or increase or decrease its activity and informing the dynamically informed digital twin to modify one or more information processing methods to thereby adjust the overall resource usage in the digital twin network.

18. The non-transitory storage medium of claim 17, further performing the following operations:
   at the orchestration service of the dynamically informed digital twin:
      receiving from each dynamically informed digital twin the one or more possible operational conditions;
      determining the updated information levels; and
      providing the updated information levels to each dynamically informed digital twin.

19. The non-transitory storage medium of claim 17, wherein the contextual variables include resource status variables for the digital twin network and environmental condition variables for the digital twin network.

20. The non-transitory storage medium of claim 17, wherein the contextual variables include resource status variables for the dynamically informed digital twin, information level variables, and quantities variables.

\* \* \* \* \*